United States Patent
Grimm et al.

(10) Patent No.: US 6,974,179 B2
(45) Date of Patent: Dec. 13, 2005

(54) VEHICLE BODYWORK COMPONENT

(75) Inventors: Rainer Grimm, Frankfurt (DE); Carmello Mondello, Kronberg (DE); Charles B. Hopson, Lebanon, TN (US)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/697,709

(22) Filed: Oct. 30, 2003

(65) Prior Publication Data

US 2004/0140692 A1 Jul. 22, 2004

(30) Foreign Application Priority Data

Nov. 2, 2002 (DE) .......................... 102 50 979

(51) Int. Cl.⁷ .............................................. B62D 25/00
(52) U.S. Cl. ..................... 296/191; 296/29; 296/39.1; 296/181.1; 296/187.02
(58) Field of Search .................. 296/29, 30, 39.1, 296/181.1, 181.2, 181.6, 187.01, 187.02, 191

(56) References Cited

U.S. PATENT DOCUMENTS

| | | | | |
|---|---|---|---|---|
| 3,627,373 A | * | 12/1971 | Fox et al. ............... | 296/187.02 |
| 3,711,148 A | * | 1/1973 | Hindin ..................... | 296/181.6 |
| 4,017,117 A | * | 4/1977 | Eggert, Jr. ............... | 296/146.9 |
| 4,399,174 A | * | 8/1983 | Tanaka et al. ............. | 428/67 |
| 4,440,434 A | | 4/1984 | Celli | |
| 4,978,490 A | | 12/1990 | Jackson ..................... | 264/148 |
| 5,102,188 A | * | 4/1992 | Yamane ..................... | 296/205 |
| 5,133,912 A | * | 7/1992 | Hagiwara et al. .......... | 264/46.4 |
| 6,217,098 B1 | * | 4/2001 | O'Brien et al. ............ | 296/70 |
| 6,250,678 B1 | * | 6/2001 | Yoshinaka et al. ......... | 280/752 |
| 6,257,652 B1 | * | 7/2001 | Stanton ..................... | 296/178 |
| 6,474,726 B1 | * | 11/2002 | Hanakawa et al. ......... | 296/191 |
| 6,499,797 B1 | * | 12/2002 | Bohm et al. ................ | 296/191 |
| 6,672,655 B2 | * | 1/2004 | Zinsmeister et al. ....... | 296/210 |
| 2003/0173801 A1 | * | 9/2003 | Bohm et al. ................ | 296/191 |
| 2004/0140692 A1 | * | 7/2004 | Grimm et al. .............. | 296/191 |

FOREIGN PATENT DOCUMENTS

| | | | | |
|---|---|---|---|---|
| DE | | 3837890 A1 | * 5/1990 | ................. 296/191 |
| DE | | 38278909 A1 | 5/1990 | |
| DE | | 199 46 008 A1 | 4/2001 | |
| DE | | 100 44 627 A1 | 3/2002 | |
| DE | | 101 58 955 A1 | 6/2003 | |
| EP | | 0 958 995 A2 | 11/1999 | |
| GB | | 2 223 712 A | 4/1990 | |

OTHER PUBLICATIONS

U.S. Appl. No. 09/670,780, filed Sep. 27, 2000.
European Search Report, Sep. 24, 2004.

* cited by examiner

Primary Examiner—Jason Morrow
(74) Attorney, Agent, or Firm—Carlson, Gaskey & Olds

(57) ABSTRACT

A vehicle bodywork component intended in particular for automotive construction is formed in the manner of a sandwich having an outer layer made from a synthetic sheet or an aluminum sheet and an inner synthetic layer, which is applied by foaming to the outer layer. The outer layer may be formed from a plurality of pieces of different colors. These may abut directly against one another. In another example, a trim or cover strip is between the pieces, which are fixedly connected to one another by the foam applied against them. The trim or cover strip may have a web-like projection which is partly enclosed in foam when the synthetic layer is applied by foaming, in order to secure the trim or cover strip in place.

20 Claims, 1 Drawing Sheet

VEHICLE BODYWORK COMPONENT

BACKGROUND OF THE INVENTION

This invention relates to vehicle bodywork components.

Vehicle bodywork components are conventionally made from steel sheets having painted surfaces that provide a protection against corrosion. If trims or the like are mounted on bodywork components of this kind, they are typically secured by means of additional securing elements which engage in cutouts in the sheet or pass through such cutouts. These securing elements cause problems of corrosion and increase the weight of the bodywork components, which are in any case undesirably heavy because of the steel sheets.

SUMMARY OF THE INVENTION

Disclosed embodiments of this invention provide vehicle bodywork components in which problems of corrosion at or caused by securing elements of trims or the like do not arise and which are comparatively lightweight with a high level of strength.

In one example, the bodywork components are formed from a synthetic sheet behind which a dimensionally stable synthetic foam is applied. Another example includes an aluminum sheet, preferably previously painted, behind which foam is correspondingly applied. Any trims or cover strips are secured by projections which at least partially protrude through and extend beyond the synthetic sheet or aluminum sheet and around which foam is applied form-fittingly during the foam application procedure. During this, the problems of corrosion which have been mentioned do not arise, nor are separate securing elements necessary, which increase the weight. Overall, the disclosed example sandwich-like bodywork components are also comparatively lightweight at the same time as having a high loading capacity.

In another example, a plurality of pieces, for example two, form the outer layer. The pieces in one example are laid together along a line of abutment and are joined in a foaming procedure by a dimensionally stable synthetic material, for example one based on PU, being applied jointly behind them in a corresponding foaming mold to form an inner foamed synthetic layer. This example provides a one-part bodywork component. In some examples, a trim or cover strip is secured in place by enclosing it in the synthetic foam.

One example eliminates the possibility that foamed synthetic material should pass outwards through the point of abutment between outer layer pieces during the foaming procedure in the mold by including an approximately U-shaped sealing profiled strip placed on bent edges of the mutually abutting pieces, which is also enclosed in foam.

The point of abutment between two pieces of the outer layer may advantageously be used to receive in sealing manner a web-like projection of a trim or cover strip. One example web-like projection is partly enclosed in the foam when the inner layer is applied by foaming, in order to secure the trim or cover strip in place. As a result of this, at the same time the point of abutment is covered with respect to the outside, that is to say it is not visible from the outside. The web-like projection may be provided with a suitable surface roughening or profiling in order to anchor it better in the foamed synthetic material.

If a synthetic sheet is used for the outer layer, it may be formed from a synthetic material having color molded in the melt in order to avoid painting.

If an aluminum sheet is used to make the outer layer, this may advantageously be painted with the desired color before the inner synthetic layer is applied by foaming.

The use of a plurality of different pieces to form the outer layer makes it possible, advantageously and regardless of whether the pieces are made from a synthetic sheet or an aluminum sheet, for the different pieces of the outer layer to have different colors. In this example, multi-colored bodywork components may be provided, with it being possible for trims or the like to be secured at the points of abutment between regions of different colors by being at least partially enclosed by the application of foam. Such trims covering the edges of the regions of different colors may overlap them. In this way, the fact that the bodywork component has an outer layer which was originally composed of two separate pieces is not visible from the outside.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
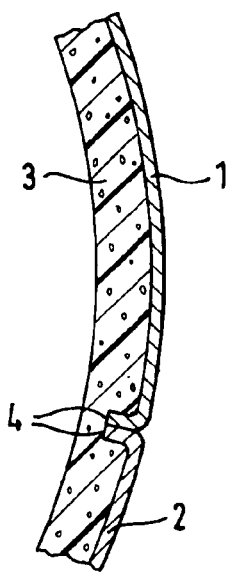
FIG. 1 shows a partial section through the outer skin of an example vehicle door, in which two different synthetic sheets are joined by foam being applied behind them.
Figure 1A:
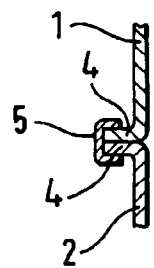
FIG. 1a shows a part section through an embodiment like FIG. 1, but showing a sealing profiled section placed on before the foam is applied.

The example vehicle bodywork component according to FIG. 1 comprises two pieces 1 and 2 which are made from a suitable synthetic sheet, which in one example is colored in the melt and so does not need to be painted. A PU foam layer 3 is applied to the back of the pieces 1 and 2. Provided at the point of abutment between the pieces 1 and 2 are inwardly directed (i.e., toward a vehicle interior when the component is mounted in place on a vehicle) bent edges 4 which are laid together without a gap between them. In order to completely eliminate the possibility that any foamed synthetic material of the foam layer 3 should pass through the point of abutment during the foaming procedure in the mold, a sealing profiled strip 5, which is approximately U-shaped in cross-section may be placed on the bent edges 4, as is apparent from FIG. 1a. Such a strip 5 is applied before foaming and becomes completely hidden within the foam layer 3.

Figure 2:
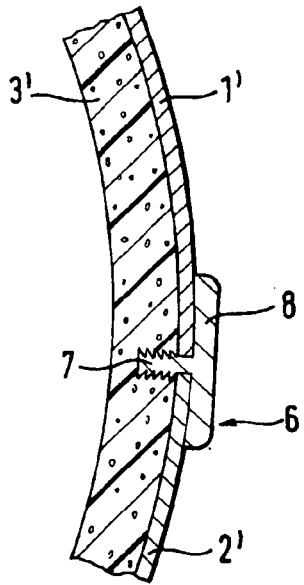
FIG. 2 shows a part section through the outer skin of another example vehicle door, with a trim or cover strip secured by foam being applied behind it.

In the example embodiment according to FIG. 2, a trim or cover strip 6, which is approximately T-shaped in cross-section and is made from metal or a synthetic material, provides sealing between the two pieces 1' and 2'. A web 7 of the trim or cover strip 6 separates the two pieces 1', 2' from one another and projects inwards so that it is partly enclosed in the foam layer 3', as a result of which the trim or cover strip 6 is secured to the bodywork component. The flange 8 of the strip 6 abuts against both pieces 1', 2' from the outside. In order to anchor the web 7 better in the foam layer 3', the web may be provided with a surface roughening or profiling in the foam of fluting or the like, in its region surrounded by foam.

Figure 3:
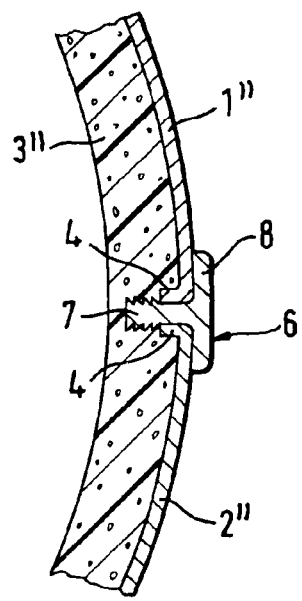
FIG. 3 shows a part section of another embodiment similar to FIG. 1, but with a trim or cover strip secured in accordance with FIG. 2.

The example embodiment illustrated in FIG. 3 is a combination of the example embodiments shown in FIGS. 1 and 2. In this case, the bent edges 4 of the pieces 1" and 2" of the outer layer do not abut directly against one another, but abut snugly against the web 7 of the trim or cover strip 6. The web 7 projects inwards beyond the bent edges 4 and is partly enclosed in the foam layer 3" for the purpose of securing the strip 6, in the manner already described.

The inventive structure of the disclosed example bodywork components allows the pieces 1, 2 or 1', 2' or 1", 2" to be of different colors. In the event of using synthetic sheets, these pieces may be given different colors in the melt, so that subsequent painting is dispensed with. If aluminum sheets are used, these may be painted or coated in different colors before they are joined by the application of foam behind them.

The disclosed examples provide a generally planar vehicle bodywork component intended in particular for automotive construction, which is formed in the manner of a sandwich from an outer layer, made from a synthetic sheet or an aluminum sheet, and an inner synthetic layer which is applied by foaming to the outer layer. The outer layer may be formed from a plurality of pieces of different colors. These may abut against one another directly or have a trim or cover strip between them. The outer layer pieces are fixedly connected to one another by the foam applied behind them. The trim or cover strip may include a web-like projection, which is partly enclosed in foam when the synthetic layer is applied by foaming, in order to secure the trim or cover trip.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle body component, comprising:
    a first sheet piece having an externally facing side that provides a vehicle body exterior surface and an internally facing side;
    a second sheet piece aligned with the first sheet piece and having an externally facing side that provides a vehicle body exterior surface and an internally facing side and having at least one edge adjacent at least one edge of the first sheet piece;
    a synthetic layer foamed onto the internally facing sides of the first and second sheet pieces such that the synthetic layer secures the first and second sheet pieces aligned with and adjacent to each other; and
    a trim member received at least partially between the at least one edge of the first and second sheet pieces.

2. The component of claim 1, wherein each of the first and second sheet pieces comprises at least one of an aluminum sheet and a synthetic material sheet.

3. The component of claim 1, wherein at least the first sheet piece comprises a synthetic material that has a selected color embodied in the material.

4. The component of claim 1, wherein the first and second sheet pieces each include a bent portion received directly against the trim member.

5. The component of claim 1, wherein the trim member has a first portion received against the externally facing side of at least the first sheet piece and a second portion extending away from the internally facing side of the first sheet piece, the second portion being received at least partially in the synthetic layer such that the trim member is held in place between the first and second sheet pieces.

6. The component of claim 5, wherein the second portion comprises a web-like projection having an uneven surface that is secured within the synthetic layer.

7. The component of claim 1, wherein the first sheet piece is a first color and the second sheet piece is a second color.

8. The component of claim 1, wherein the externally facing side of the first sheet piece extends at least partially along a plane and the externally facing side of the second sheet piece extends at least partially along the plane.

9. The component of claim 8, wherein the at least one edge of the first and second sheet pieces extend transverse to the plane.

10. The component of claim 9, including a seal member contacting the at least one edge of the first and second sheet pieces, the seal member isolating a seam between the at least one edge of the first and second sheet pieces from the synthetic layer.

11. A vehicle bodywork component, comprising:
    a first sheet piece having a surface extending at least partially along a plane and a bent portion extending transverse to the plane;
    a second sheet piece having a surface aligned with the surface of the first sheet piece such that the surface of the second sheet piece extends at least partially along the plane and having a bent portion adjacent the bent portion of the first sheet piece;
    an inner layer that is foamed onto the first and second sheet pieces such that the inner layer secures the first and second sheet pieces aligned with and adjacent to each other; and
    at least one trim piece having a first portion received against the surface of the first sheet piece and a second portion that extends away from the first portion and is at least partially received and secured within the inner layer.

12. The component of claim 11, wherein the bent portions of the first and second sheet pieces are received directly against the second portion of the trim piece.

13. The component of claim 12, including a sealing member extending at least partially along a seam between the bent portions, the sealing member being received within the inner layer.

14. The component of claim 11, wherein the second portion of the trim piece comprises a web-like projection having an uneven surface that is secured within the inner layer.

15. The component of claim 11, wherein the first sheet piece is a first color and the second sheet piece is a second color.

16. The component of claim 11, wherein at least one of the first or second sheet pieces comprises a synthetic material that has a selected color embodied in the material.

17. The component of claim 11, wherein the first and second sheet pieces each comprise at least one of an aluminum sheet and a synthetic material sheet.

18. The component of claim 11, wherein the surfaces of the first and second sheet pieces extending at least partially along the plane provide a vehicle body exterior surface.

19. A vehicle body component, comprising:
    a first sheet piece having an externally facing side that provides a vehicle body exterior surface and an internally facing side;

a second sheet piece aligned with the first sheet piece and having an externally facing side that provides a vehicle body exterior surface and an internally facing side and having at least one edge adjacent at least one edge of the first sheet piece;

a synthetic layer foamed onto the internally facing sides of the first and second sheet pieces such that the synthetic layer secures the first and second sheet pieces aligned with and adjacent to each other; and a sealing member extending across and received directly against the first and second sheet pieces along a seam between the at least one edge of the first and second sheet pieces, the sealing member isolating the synthetic layer from contact with the seam.

20. The component of claim 19, wherein the externally facing sides of the first and second sheet pieces extend at least partially along a common plane.

* * * * *